US012608074B2

(12) United States Patent
Gai

(10) Patent No.: US 12,608,074 B2
(45) Date of Patent: Apr. 21, 2026

(54) POSITION CHANGE-BASED VR INTERACTION METHOD AND SYSTEM

(71) Applicant: Qingdao Pico Technology Co., Ltd., Shandong (CN)

(72) Inventor: Weidong Gai, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 126 days.

(21) Appl. No.: 18/281,688

(22) PCT Filed: Mar. 23, 2022

(86) PCT No.: PCT/CN2022/082466
§ 371 (c)(1),
(2) Date: Sep. 12, 2023

(87) PCT Pub. No.: WO2023/015895
PCT Pub. Date: Feb. 16, 2023

(65) Prior Publication Data
US 2024/0152201 A1     May 9, 2024

(30) Foreign Application Priority Data
Aug. 10, 2021     (CN) .......................... 202110914930.8

(51) Int. Cl.
*G06F 3/01*          (2006.01)
*G06T 7/20*          (2017.01)

(52) U.S. Cl.
CPC ................ *G06F 3/011* (2013.01); *G06T 7/20* (2013.01)

(58) Field of Classification Search
CPC ........ G06F 3/011; G06F 3/017; G06F 3/0487; G06F 2203/012; G06T 7/20
See application file for complete search history.

(56) References Cited

U.S. PATENT DOCUMENTS 10,139,899 B1    11/2018   Niemeyer et al.
10,540,001 B1 *   1/2020   Poupyrev ............. G06V 10/806
(Continued)

FOREIGN PATENT DOCUMENTS

CN          105242780 A      1/2016
CN          105718163 A      6/2016
(Continued)

OTHER PUBLICATIONS

International Search Report in PCT/CN2022/082466, mailed Jun. 1, 2022, 4 pages.
(Continued)

*Primary Examiner* — Xiao M Wu
(74) *Attorney, Agent, or Firm* — Astute IP Law Group

(57) ABSTRACT

Provided are a position change-based VR interaction method and system. First, the VR system is controlled to perform the relative motion under the predetermined posture, and the relative position point of the relative motion is captured through the sensor. Then, the relative displacement amount of the relative motion is determined according to the relative position point. Afterwards, based on the state of the VR system, whether the relative displacement amount is within in the predetermined interaction threshold interval is determined, and the interaction instruction corresponding to the predetermined posture is obtained when the relative displacement amount is within in the interaction threshold interval. In this way, the corresponding shortcut interaction operation is performed based on the interaction instruction.

16 Claims, 2 Drawing Sheets

(56)          References Cited

U.S. PATENT DOCUMENTS

2017/0053443  A1      2/2017  Diament et al.
2018/0364808  A1 *  12/2018  Pahud ................... G06F 3/0482

FOREIGN PATENT DOCUMENTS

| CN | 106030495 | A | * | 10/2016 | ............. | G06F 3/017 |
|----|-----------|---|---|---------|--------------|------------|
| CN | 106060612 | A | | 10/2016 | | |
| CN | 106383597 | A | | 2/2017 | | |
| CN | 106970757 | A | | 7/2017 | | |
| CN | 107728811 | A | | 2/2018 | | |
| CN | 111000328 | A | | 4/2020 | | |
| CN | 111221418 | A | | 6/2020 | | |
| CN | 111459263 | A | | 7/2020 | | |
| CN | 113687717 | A | | 11/2021 | | |
| CN | 113918020 | A | | 1/2022 | | |

OTHER PUBLICATIONS

Office Action for Chinese Patent Application No. 202110914930.8, mailed May 21, 2024, 15 pages.

* cited by examiner

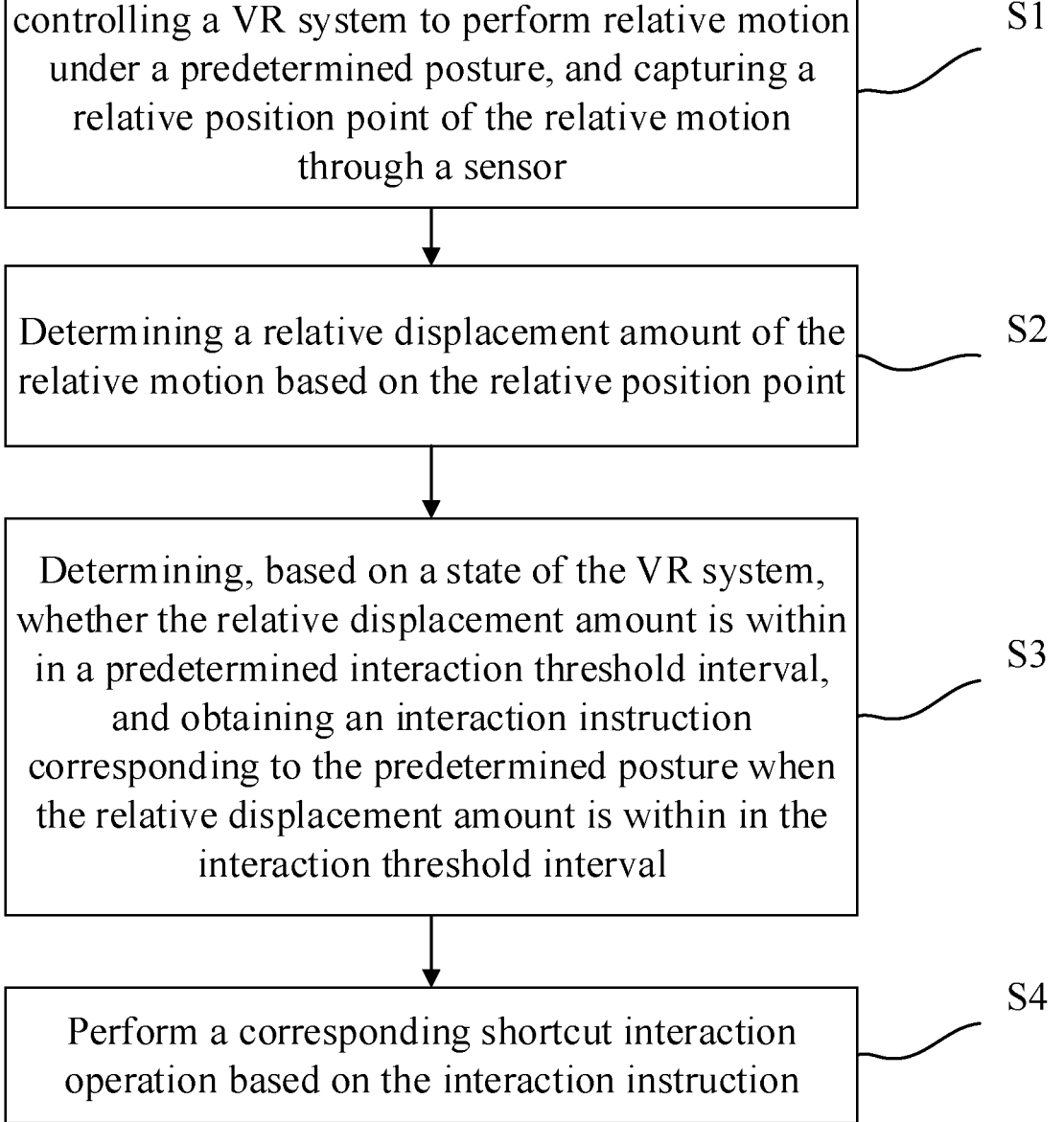

controlling a VR system to perform relative motion under a predetermined posture, and capturing a relative position point of the relative motion through a sensor

S1

Determining a relative displacement amount of the relative motion based on the relative position point

S2

Determining, based on a state of the VR system, whether the relative displacement amount is within in a predetermined interaction threshold interval, and obtaining an interaction instruction corresponding to the predetermined posture when the relative displacement amount is within in the interaction threshold interval

S3

Perform a corresponding shortcut interaction operation based on the interaction instruction

POSITION CHANGE-BASED VR INTERACTION METHOD AND SYSTEM

CROSS-REFERENCE TO RELATED APPLICATIONS

This is a national stage application filed under 37 U.S.C. 371 of International Patent Application No. PCT/CN2022/ 082466, filed Mar. 23, 2022, which claims priority to Chinese Patent Application No. 202110914930.8, entitled "Position change-based VR interaction method and system", filed on Aug. 10, 2021, the disclosures of which are incorporated herein by reference in their entireties.

TECHNICAL FIELD

The present disclosure relates to the technical field of virtual reality, and more particularly, to a position change-based VR interaction method and system.

BACKGROUND

Due to advances in science and technology and the diversified development of market demand, virtual reality systems are becoming more and more common and applied in many fields, such as computer games, health and safety, industry, and educational training. To name a few, hybrid virtual reality systems are integrated into every corner of life such as mobile communication devices, gaming machines, personal computers, cinemas, theme parks, university laboratories, student classrooms, hospital exercise rooms, etc.

With the development of VR products, there are more and more kinds of VR content, while the rich content ecology is facing users, the social interaction of VR content is improving. Diverse social interactions need to provide users with more convenient and efficient forms of interaction to meet their demand.

At present, the interaction mode of VR devices is relatively basic, for example, the common screen capturing function can only be performed via click interaction after the system menu is invoked, that is, switching the system interface→selecting screen capturing option→clicking "Home" screen capturing→completing screen capturing. In this mode, sometimes the user may miss the highlight instant that the user wants to immediately capture, or the auxiliary application of live broadcast, and the consumer needs to manually invoke each use; there is no convenient interaction mode that can quickly and directly operate according to the user's habit, making the experience of VR products cumbersome and complicated.

Therefore, there is an urgent need for an efficient and convenient position change-based VR interaction method and system, which avoids the cumbersome interface jump process.

SUMMARY

In view of the above, one embodiment of the present disclosure aims to provide a position change-based VR interaction method and system, to solve the problems of complicated interaction modes of the existing VR system.

The present disclosure provides a position change-based VR interaction method, including: controlling a VR system to perform relative motion under a predetermined posture, and capturing a relative position point of the relative motion through a sensor; determining a relative displacement amount of the relative motion based on the relative position point; determining, based on a state of the VR system, whether the relative displacement amount is within in a predetermined interaction threshold interval, and obtaining an interaction instruction corresponding to the predetermined posture when the relative displacement amount is within in the interaction threshold interval; and performing a corresponding shortcut interaction operation based on the interaction instruction.

In an embodiment, the relative position point includes a starting position point and an ending position point that are based on the predetermined posture.

In an embodiment, the relative displacement amount is a displacement difference between the starting position point and the ending position point.

In an embodiment, the relative position point includes motion trajectory points generated by the VR system based on the predetermined posture.

In an embodiment, the relative displacement amount includes an interleaving point or an interleaving frequency of the motion trajectory points.

In an embodiment, the determining, based on the state of the VR system, whether the relative displacement amount is within in the predetermined interaction threshold interval includes: obtaining state information of the VR system; determining, based on the state information, whether the VR system is in an on state and whether there is a key value click on the VR system; determining, when the VR system is in the on state and there is no key value click, whether the relative displacement amount is greater than a minimum value within the interaction threshold interval and smaller than a maximum value within the interaction threshold interval; and determining, when the relative displacement amount is greater than the minimum value within the interaction threshold interval and smaller than the maximum value within the interaction threshold interval, that the relative displacement amount is within in a predetermined interaction threshold interval.

In an embodiment, the obtaining the interaction instruction corresponding to the predetermined posture includes: determining the predetermined posture based on the relative position point; and obtaining, through matching the predetermined posture with a corresponding interaction instruction in a predetermined database, the corresponding interaction instruction.

The present disclosure also provides a position change-based VR interaction system, implementing the abovementioned position change-based VR interaction method. The position change-based VR interaction system includes a VR system, and a sensor and a processor that are integrated in the VR system. The processor includes a calculation unit, a matching unit, and an execution unit. The sensor is configured to capture, through controlling the VR system to perform relative motion under a predetermined posture, a relative position point of the relative motion. The calculation unit is configured to determine a relative displacement amount of the relative motion based on the relative position point. The matching unit is configured to determine, based on a state of the VR system, whether the relative displacement amount is within in a predetermined interaction threshold interval and obtain an interaction instruction corresponding to the predetermined posture when the relative displacement amount is within in the interaction threshold interval. The execution unit is configured to perform a corresponding shortcut interaction operation based on the interaction instruction.

In an embodiment, the position change-based VR interaction system includes a user center. The user center is configured to provide a user with a configuration channel for allowing predetermined postures to correspond to interaction instructions.

In an embodiment, the position change-based VR interaction system includes a database. The database is connected to the user center and configured to store the interaction instructions corresponding to the predetermined postures.

As can be seen from the above-mentioned technical solutions, according to the position change-based VR interaction method and system provided by the present disclosure, firstly, the VR system is controlled to perform the relative motion under the predetermined posture, and the relative position point of the relative motion is captured through the sensor. Then, the relative displacement amount of the relative motion is determined according to the relative position point. Afterwards, based on the state of the VR system, whether the relative displacement amount is within in the predetermined interaction threshold interval is determined, and the interaction instruction corresponding to the predetermined posture is obtained when the relative displacement amount is within in the interaction threshold interval. Afterwards, the corresponding shortcut interaction operation is performed based on the interaction instruction. The VR interaction is completed. In this way, the VR interaction may be completed without clicking a system menu, and the user may easily complete various shortcut operations while experiencing wonderful content. Besides, common content videos and applications may be customized according to user habits to enable a device to directly reach a customized experience content area and improve the immersion and convenience of the VR interaction.

BRIEF DESCRIPTION OF DRAWINGS

Other embodiments and results of the present disclosure will become more apparent and appreciated as the disclosure becomes more fully understood by reference to the following description taken in conjunction with the accompanying drawings. In the drawings:

FIG. 1 is a flow diagram of a position change-based VR interaction method according to an embodiment of the present disclosure.

DESCRIPTION OF EMBODIMENTS

Figure 2:
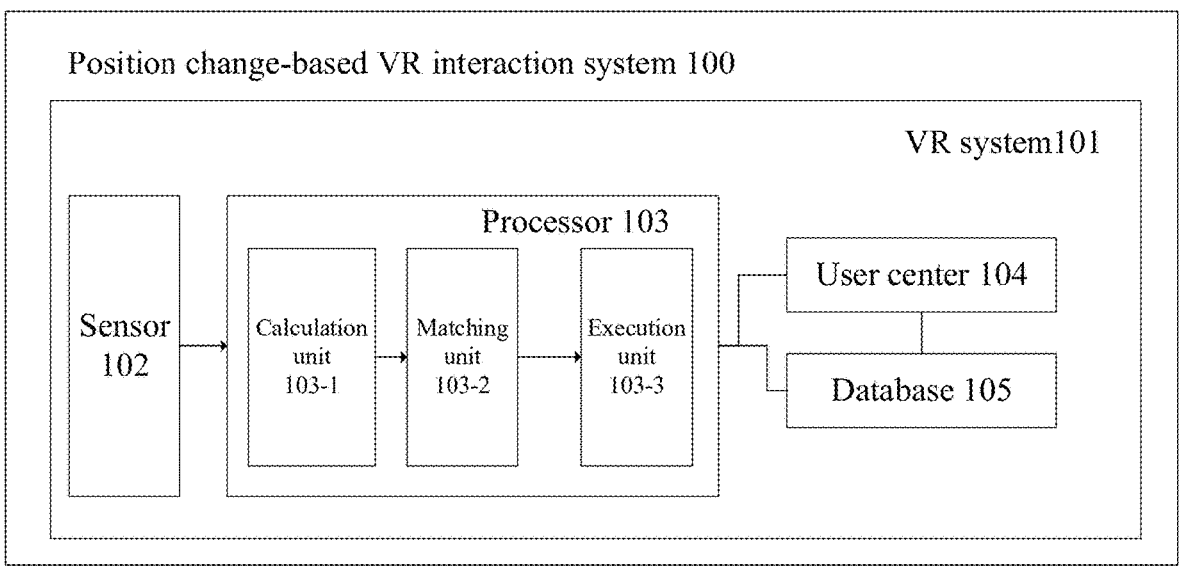
FIG. 2 is a schematic diagram of a position change-based VR interaction system according to an embodiment of the present disclosure.

At present, the interaction mode of VR devices is relatively basic, for example, the common screen capturing function can only be performed via click interaction after the system menu is invoked, that is, switching the system interface→selecting screen capturing option→clicking "Home" screen capturing→completing screen capturing. In this mode, sometimes the user may miss the highlight instant that the user wants to immediately capture, or the auxiliary application of live broadcast, and the consumer needs to manually invoke each use; there is no convenient interaction mode that can quickly and directly operate according to the user's habit, making the experience of VR products cumbersome and complicated.

In response to the above-mentioned problems, the present disclosure provides a position change-based VR interaction method and system, and exemplary embodiments of the present disclosure will be described in detail below with reference to the accompanying drawings.

To illustrate the position change-based VR interaction method and system provided by the present disclosure, FIG. 1 exemplifies the position change-based VR interaction method of an embodiment of the present disclosure; and FIG. 2 exemplifies the position change-based VR interaction system of an embodiment of the present disclosure.

The following description of the exemplary embodiments is merely illustrative in nature and is in no way intended to limit the present disclosure, its application, or uses. Techniques and devices known to those of ordinary skill in the relevant art may not be discussed in detail, but should be considered part of the specification where appropriate.

As shown in FIG. 1, the present disclosure provides a position change-based VR interaction method of an embodiment of the present disclosure, and the method includes operations at blocks.

S1: a VR system is controlled to perform relative motion under a predetermined posture, and a relative position point of the relative motion is captured through a sensor.

S2: a relative displacement amount of the relative motion is determined based on the relative position point.

S3: based on a state of the VR system, whether the relative displacement amount is within in a predetermined interaction threshold interval is determined, and an interaction instruction corresponding to the predetermined posture is obtained when the relative displacement amount is within in the interaction threshold interval.

S4: a corresponding shortcut interaction operation is performed based on the interaction instruction.

As shown in FIG. 1, in the block S1, the predetermined posture is not particularly limited, and may be freely set according to the preference of a user. The predetermined posture may be any action having a position change, such as tapping the VR system, shaking the VR system, holding the handheld device or headset in the VR system. Taking tapping the VR system as an example, during the process of tapping the device, the headset in the VR system will have a slight position change. Namely, the VR system is controlled to perform the relative motion, and captures the relative position point of the relative motion through the sensor to obtain an amplitude of the relative motion of the VR system.

In the embodiment shown in FIG. 1, the block S2 is a process of determining a relative displacement amount of the relative motion based on the relative position point. Namely, position information about the VR system at the current moment with position information recorded at multiple moments in a tapping process are compared. Then a vector operation or an interpolation operation are performed to obtain the relative displacement amount.

In an exemplary embodiment, the relative position point includes a starting position point and an ending position point that are based on a predetermined posture, and the relative displacement amount is a displacement difference between the starting position point and the ending position point. Namely, the displacement difference (difference value) between position information about the VR system (ending position point) at the current moment and the starting position point is obtained. Taking a user of tapping the trigger point position of a headset device or a handheld device in the VR system through a finger as an example, when the user tapping the trigger point position of the headset device or the handheld device with the finger, a sensor detects a starting position point of the headset device or the handheld device when triggered, and then detects an ending position point after vibration (movement) caused by the trigger. The difference value (displacement difference) between the ending position point and the starting position point is calculated, and then whether it is a displacement difference generated by an interaction action according to the difference value is determined.

In another exemplary embodiment, the relative position point includes motion trajectory points generated by the VR system based on the predetermined posture, and the relative displacement amount includes (is) an interleaving point or an interleaving frequency of the motion trajectory points. Namely, if the predetermined posture is holding a handheld device in the VR system, etc. a trajectory of a multi-device position re-interleaving combination type may be used as a determination basis according to the method in the present embodiment. In the present embodiment, taking the handheld device or the headset device as an example, the user generates relative motion between the handheld device and the headset device according to the predetermined posture or the predetermined trajectory. Thus, an interleaving point or an interleaving frequency of a motion trajectory between the handheld device and the headset is obtained through the sensor. Then, it is determined whether the user's behavior is triggering an interaction operation by determining whether the interleaving point and the interleaving frequency meet a predetermined requirement.

In the embodiment shown in FIG. 1, the block S3 is a process of determining, based on a state of the VR system, whether the relative displacement amount is within in a predetermined interaction threshold interval, and obtaining an interaction instruction corresponding to the predetermined posture when the relative displacement amount is within in the interaction threshold interval. Exemplarily, based on the state of the VR system, determining whether the VR system is in an on state and whether there is a condition of pressing a physical key or not, to ensure that the above-mentioned relative displacement amount is generated due to the predetermined posture of a user rather than due to other operations. When it is ensured that it is caused by the predetermined posture of the user, the VR system can only continue to confirm whether the relative displacement amount is in a predetermined interaction threshold interval, thereby ensuring that the user's intention is an interaction operation. Exemplarily, the process of determining, based on the state of the VR system, whether the relative displacement amount is within in the predetermined interaction threshold interval includes operations at blocks.

S31: state information of the VR system is obtained.

S32: based on the state information, whether the VR system is in an on state and whether there is a key value click on the VR system are determined.

S33: when the VR system is in the on state and there is no key value click, whether the relative displacement amount is greater than a minimum value within the interaction threshold interval and smaller than a maximum value within the interaction threshold interval is determined.

S34: when the relative displacement amount is greater than the minimum value within the interaction threshold interval and smaller than the maximum value within the interaction threshold interval, it is determined that the relative displacement amount is within in a predetermined interaction threshold interval.

If the relative displacement amount is within in the interaction threshold interval, it is determined that the intention of the user is to perform the interaction operation. Then, the interaction instruction corresponding to the predetermined posture is obtained. The process of obtaining the interaction instruction corresponding to the predetermined posture includes operations at blocks.

S351: the predetermined posture based on the relative position point is determined.

S352: the corresponding interaction instruction is obtained through matching the predetermined posture with a corresponding interaction instruction in a predetermined database.

The interaction instruction may be any operation instruction having interaction properties, such as screen capturing and screen recording through gestures.

In the embodiment shown in FIG. 1, the block S4 is a process of performing a corresponding shortcut interaction operation based on the interaction instruction. Namely, a series of interaction operations such as screen capturing and screen recording through the interaction instruction are performed, and thus a shortcut response is performed, which solves the problem of complicated interaction modes of the existing VR system and improves the convenience of the VR system.

As stated above, according to the position change-based VR interaction method provided by the present disclosure, firstly, the VR system is controlled to perform the relative motion under the predetermined posture, and the relative position point of the relative motion is captured through the sensor. Then, the relative displacement amount of the relative motion is determined according to the relative position point. Afterwards, based on the state of the VR system, whether the relative displacement amount is within in the predetermined interaction threshold interval is determined, and the interaction instruction corresponding to the predetermined posture is obtained when the relative displacement amount is within in the interaction threshold interval. Afterwards, the corresponding shortcut interaction operation is performed based on the interaction instruction. The VR interaction is completed. In this way, the VR interaction may be completed without clicking a system menu, and the user may easily complete various shortcut operations while experiencing wonderful content. Besides, common content videos and applications may be customized according to user habits to enable a device to directly reach a customized experience content area and improve the immersion and convenience of the VR interaction.

As shown in FIG. 2, the present disclosure also provides a position change-based VR interaction system 100, implementing the above-mentioned position change-based VR interaction method, including a VR system 101, and a sensor 102 and a processor 103 that are integrated in the VR system 101. The processor 103 includes a calculation unit 103-1, a matching unit 103-2 and an execution unit 103-3.

The sensor 102 is configured to capture, through controlling the VR system 101 to perform relative motion under a predetermined posture, a relative position point of the relative motion.

The calculation unit 103-1 is configured to determine a relative displacement amount of the relative motion based on the relative position point.

The matching unit 103-2 is configured to determine, based on a state of the VR system, whether the relative displacement amount is within in a predetermined interaction threshold interval and obtain an interaction instruction corresponding to the predetermined posture when the relative displacement amount is within in the interaction threshold interval.

The execution unit 103-3 is configured to perform a corresponding shortcut interaction operation based on the interaction instruction.

The embodiment shown in FIG. 2 includes a user center 104.

The user center 104 is configured to provide a user with a configuration channel for allowing predetermined postures to correspond to interaction instructions.

The embodiment shown in FIG. 2 also includes a database 105.

The database 105 is connected to the user center 104 and configured to store the interaction instructions corresponding to the predetermined postures.

As can be seen from the above-mentioned embodiments, according to the position change-based VR interaction system 100 provided by the present disclosure, firstly, the VR system 101 is controlled to perform the relative motion under the predetermined posture, and captures the relative position point of the relative motion through the sensor 102. Then the calculation unit 103-1 determines the relative displacement amount of the relative motion based on the relative position point. Afterwards, based on the state of the VR system 101, the matching unit 103-2 determines whether the relative displacement amount is included in a predetermined interaction threshold interval, and obtain an interaction instruction corresponding to the predetermined posture when the relative displacement amount is within in the interaction threshold interval. The execution unit 103-3 performs the corresponding shortcut interaction operation according to the interaction instruction and completes VR interaction. In this way, the VR interaction may be completed without clicking a system menu, and the user may easily complete various shortcut operations while experiencing wonderful content. Besides, common content videos and applications may be customized according to user habits to enable a device to directly reach a customized experience content area and improve the immersion and convenience of the VR interaction.

A position change-based VR interaction method and system proposed according to the present disclosure is described above by way of example with reference to the accompanying drawings. However, it will be appreciated by those skilled in the art that various modifications may be made to the position change-based VR interaction method and system as set forth in the above disclosure without departing from the present disclosure. Accordingly, the scope of the present disclosure should be determined with reference to the appended claims.

What is claimed is:

1. A position change-based VR interaction method, comprising:

controlling a VR system to perform relative motion under a predetermined posture, and capturing a relative position point of the relative motion through a sensor;

determining a relative displacement amount of the relative motion based on the relative position point;

determining, based on a state of the VR system, whether the relative displacement amount is within in a predetermined interaction threshold interval, and obtaining an interaction instruction corresponding to the predetermined posture when the relative displacement amount is within in the interaction threshold interval; and performing a corresponding shortcut interaction operation based on the interaction instruction.

2. The position change-based VR interaction method according to claim 1, wherein the relative position point comprises a starting position point and an ending position point that are based on the predetermined posture.

3. The position change-based VR interaction method according to claim 2, wherein the relative displacement amount is a displacement difference between the starting position point and the ending position point.

4. The position change-based VR interaction method according to claim 1, wherein the relative position point comprises motion trajectory points generated by the VR system based on the predetermined posture.

5. The position change-based VR interaction method according to claim 4, wherein the relative displacement amount comprises an interleaving point or an interleaving frequency of the motion trajectory points.

6. The position change-based VR interaction method according to claim 1, wherein said determining, based on the state of the VR system, whether the relative displacement amount is within in the predetermined interaction threshold interval comprises:

obtaining state information of the VR system;

determining, based on the state information, whether the VR system is in an on state and whether there is a key value click on the VR system;

determining, when the VR system is in the on state and there is no key value click, whether the relative displacement amount is greater than a minimum value within the interaction threshold interval and smaller than a maximum value within the interaction threshold interval; and determining, when the relative displacement amount is greater than the minimum value within the interaction threshold interval and smaller than the maximum value within the interaction threshold interval, that the relative displacement amount is within in a predetermined interaction threshold interval.

7. The position change-based VR interaction method according to claim 6, wherein said obtaining the interaction instruction corresponding to the predetermined posture comprises:

determining the predetermined posture based on the relative position point; and obtaining, through matching the predetermined posture with a corresponding interaction instruction in a predetermined database, the corresponding interaction instruction.

8. A position change-based VR interaction system, implementing the position change-based VR interaction method according to claim 1, the position change-based VR interaction system comprising a VR system, a sensor and a processor that are integrated in the VR system, the processor comprising a calculation unit, a matching unit, and an execution unit, wherein the sensor is configured to capture, through controlling the VR system to perform relative motion under a predetermined posture, a relative position point of the relative motion;

the calculation unit is configured to determine a relative displacement amount of the relative motion based on the relative position point;

the matching unit is configured to determine, based on a state of the VR system, whether the relative displacement amount is within in a predetermined interaction threshold interval and obtain an interaction instruction corresponding to the predetermined posture when the relative displacement amount is within in the interaction threshold interval; and

the execution unit is configured to perform a corresponding shortcut interaction operation based on the interaction instruction.

9. The position change-based VR interaction system according to claim 8, wherein the relative position point comprises a starting position point and an ending position point that are based on the predetermined posture.

10. The position change-based VR interaction system according to claim 9, wherein the relative displacement amount is a displacement difference between the starting position point and the ending position point.

11. The position change-based VR interaction system according to claim 8, wherein the relative position point comprises motion trajectory points generated by the VR system based on the predetermined posture.

12. The position change-based VR interaction system according to claim 11, wherein the relative displacement amount comprises an interleaving point or an interleaving frequency of the motion trajectory points.

13. The position change-based VR interaction system according to claim 8, wherein said determining, based on the state of the VR system, whether the relative displacement amount is within in the predetermined interaction threshold interval comprises:

obtaining state information of the VR system;

determining, based on the state information, whether the VR system is in an on state and whether there is a key value click on the VR system;

determining, when the VR system is in the on state and there is no key value click, whether the relative displacement amount is greater than a minimum value within the interaction threshold interval and smaller than a maximum value within the interaction threshold interval; and determining, when the relative displacement amount is greater than the minimum value within the interaction threshold interval and smaller than the maximum value within the interaction threshold interval, that the relative displacement amount is within in a predetermined interaction threshold interval.

14. The position change-based VR interaction system according to claim 13, wherein said obtaining the interaction instruction corresponding to the predetermined posture comprises:

determining the predetermined posture based on the relative position point; and obtaining, through matching the predetermined posture with a corresponding interaction instruction in a predetermined database, the corresponding interaction instruction.

15. The position change-based VR interaction system according to claim 8, comprising a user center, wherein the user center is configured to provide a user with a configuration channel for allowing predetermined postures to correspond to interaction instructions.

16. The position change-based VR interaction system according to claim 15, further comprising a database, wherein the database is connected to the user center and configured to store the interaction instructions corresponding to the predetermined postures.

* * * * *